Sept. 1, 1942.  G. W. DICK  2,294,391

AQUA-POISE LIQUID LEVEL CONTROLLER

Filed July 31, 1941

GEORGE W. DICK
INVENTOR

BY *J. F. Mothershead*

ATTORNEY

Patented Sept. 1, 1942

2,294,391

UNITED STATES PATENT OFFICE 2,294,391

AQUAPOISE LIQUID LEVEL CONTROLLER

George W. Dick, Brooklyn Park, Md.

Application July 31, 1941, Serial No. 404,879

2 Claims. (Cl. 137—68)

(Granted under the act of March 3, 1883, as amended April 30, 1928; 370 O. G. 757)

This invention relates to controlling the level of liquid in tanks, drums or other vessels, and it is particularly advantageous for controlling the surface level of liquid in closed vessels operating under absolute pressure, as, for example, in evaporators, such as those used in marine installations for supplying fresh water at sea.

The make-up water or other liquid for vessels of this general class may be required in variable quantities more or less intermittently, depending upon the demand. It is highly desirable to be able to supply the make-up liquid substantially at the same rate and at the same time that the quantity of liquid in the vessel decreases, for this contributes to improved efficiency, as by avoiding a sudden rush of cold water into an evaporator, for example, and thereby chilling the whole system. It has been found that liquid level controls using floats and the like do not give continued service of a satisfactory character for these purposes, especially when the make-up liquid consists of sea water or other liquid which is corrosive to metallic parts or which deposits solid particles which interfere with good operation of mechanical parts. For instance, liquid level regulators embodying a float for installations of this kind may also require a stuffing box in the shell of the vessel through which motion may be transmitted for operating an external valve which controls the supply of make-up liquid. These stuffing boxes present large areas of frictional contact where the friction increases, for example, as the brine and salt paste accumulate when using sea water. This condition frequently causes the operating parts associated with the float to stick in the stuffing box, thereby rendering the float inoperative at various odd intervals. This increased friction in the stuffing boxes, when not actually rendering the device inoperative, may deprive it of the requisite sensitivity and result in a delayed, irregular or jerky action which makes the supply valve late in operating and causes it to open or to close suddenly or at an excessive rate and to a greater or lesser extent than is desirable for good operation. Other liquid level regulators using a float for controlling electrical contacts have been found objectionable, partly because of increased friction and partly due to the practical difficulty of arranging electrical contacts to provide for gradual and progressive opening and closing of the supply valve at a rate corresponding to the demand upon the system.

Liquid level regulators, such as those of the float controlled type, which have operating parts disposed within the vessel in which the liquid level is to be controlled, are relatively inaccessible and usually present installation as well as overhaul difficulties. It is very difficult, if not practically impossible, to observe the performance of such regulators closely enough to determine with reasonable certainty whether they are functioning properly. Many float controlled regulators which are often comparatively expensive have as high as approximately 70% of their parts exposed to corrosion which decreases the useful life especially of internal parts which are difficult to inspect and replace.

The purposes of the present invention are to provide an improved liquid level regulator which is free from objectionable features of the kind just mentioned; to provide means substantially unaffected by corrosive liquids, concentrates and the like, for operating a device such as a supply valve with a relatively smooth, continuous or intermittent motion which may be gradually and progressively accelerated or decelerated at a proper rate in response to changes in the level of a liquid for maintaining the latter at a substantially constant, desired level; to provide a liquid level controller or regulator which may be so constructed and arranged that its working or moving parts may be disposed exteriorly of the vessel in which the liquid level is to be controlled; to provide a device of the class described in which there is little opportunity for accumulation of corrosive concentrate and the like resulting from the treatment of the liquid supplied, as for accumulation of brine and salt paste resulting from evaporation of sea water; to provide a device of the class described having only a relatively small proportion thereof exposed to the corrosive action of the liquid supplied; to provide a device of the class described which may be so constructed that its operation may be plainly visible at all times; and also to provide a device of the class described which may be sensitive and positive in action and yet consist of relatively few parts which may be comparatively simple and inexpensive to manufacture and assemble and which may be readily accessible for inspection and repair.

This invention provides for allowing liquid preferably from the vessel in which the level is to be controlled to find its own level exteriorly thereof under similar conditions of pressure in a relatively small body of liquid in which the quantity of liquid and also the surface level thereof change as the liquid level changes in the vessel in which the liquid level is to be controlled.

The change in quantity and therefore in the mass or weight of this small body of liquid may be utilized for controlling the flow of liquid from a source of supply thereof to the vessel or chamber in which the liquid level is to be controlled so as to restore the desired level therein. This may be accomplished in accordance with this invention preferably by using this small body of liquid as a part of a balance system arranged to be in equilibrium when the desired level prevails. In this way any change from the level desired to be maintained is accompanied by a similar change in the surface level and therefore in the quantity and weight of the small body of liquid so as to disturb the equilibrium of the balance system by producing a condition of unbalance which may be capable of providing motion and power adequate for directly actuating the supply valve to partly or fully open or close the same as conditions may required. As the liquid returns to the desired level in the vessel in which the level is to be controlled, the small body of liquid also returns to its initial surface level so that its weight restores the balance system to a condition of equilibrium which then prevails until again disturbed and restored in a like manner.

The features of the invention are illustrated in the accompanying drawing, wherein.

Figure 1:
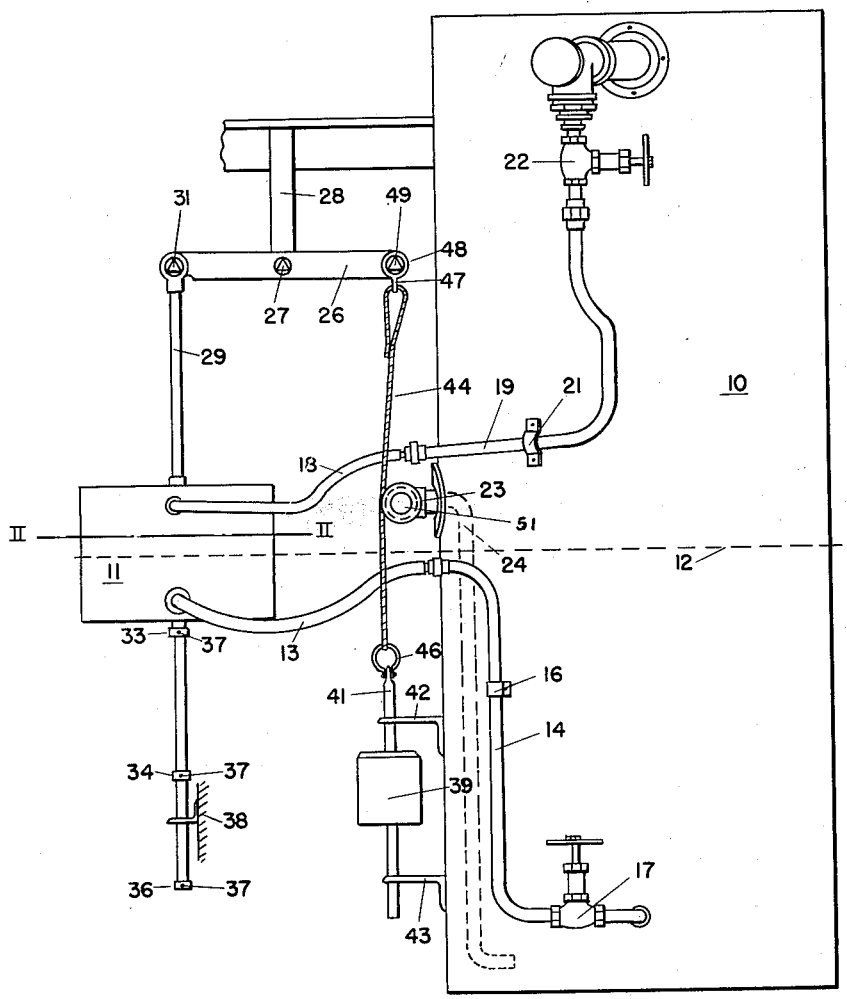
Fig. 1 is a side elevational view illustrating an evaporator equipped with means for regulating or controlling the liquid level therein.

The embodiment selected for illustration comprises a relatively fixed chamber in the form of an evaporator 10 and a relatively movable chamber in the form of a tank 11 adapted to contain a body of liquid which may be and preferably is small compared to the quantity of liquid which it is desired to maintain in the evaporator. For purposes of illustration it may be assumed that with this particular apparatus it is desirable to maintain the level of the liquid in the evaporator substantially constant at the dotted line 12. For this purpose a relatively small body of liquid, preferably from the evaporator, may be maintained exteriorly thereof in the tank 11. In order that variations in the level of liquid in the evaporator may produce similar variations in the surface level and also in the quantity and therefore, of the mass or weight of the small body of liquid in the tank 11, means may be provided for maintaining a liquid pressure communication between the liquid space of the evaporator and that of the tank 11, as by means of a flexible connection such as a suitable hose 13 extending preferably from the lower portion of the liquid space of the tank 11 for a sufficient distance to allow for the relative movement of this tank. This hose may be connected to a pipe section 14 mounted on the evaporator shell, as by means of a bracket 16, and affording communication through the shell preferably to the lower portion of the liquid space of the evaporator. A suitable valve 17 may be provided preferably in the pipe section 14 for isolating the evaporator from the flexible section 13 and from the small tank 11 whenever this is desired.

The evaporator 10 may be and preferably is of the type closed to atmosphere and adapted to operate under absolute pressure above or below atmospheric pressure. On the other hand it may be desirable in some instances to have the tank 11 open to atmosphere and in such cases it will be understood by those skilled in this art that appropriate allowances for difference in level between these two chambers must be made. In the form shown the tank 11 is closed to atmosphere and therefore the vapor space of this tank is connected to the vapor space of the evaporator preferably by a flexible connection such as a suitable hose 18 extending preferably from the upper portion of the vapor space of the tank 11 for a sufficient distance to provide for the relative movement of this tank. This hose may be connected to a pipe section 19 mounted on the evaporator shell, as by means of a bracket 21, and leading preferably into the upper portion of the vapor space of the evaporator shell. A suitable valve 22 may also be interposed, preferably in the pipe section 19, for isolating the vapor space of the evaporator from that of the tank 11 and also from the flexible connection 18. In the apparatus as thus arranged it will be evident that the liquid in the tank 11 will seek the same level as that in the evaporator, as indicated by the dotted line 12.

When the evaporator is in use liquid must be added thereto in variable quantities more or less continuously depending upon requirements of the system in order to maintain the desired liquid level as indicated by the dotted line 12. This make-up liquid may be supplied through a suitable feed valve 23 adapted to be partly or fully open or closed. Conveniently, this feed valve may be mounted on a pipe section 24 extending through the evaporator shell and preferably into the lower portion of the liquid space thereof.

Figure 2:
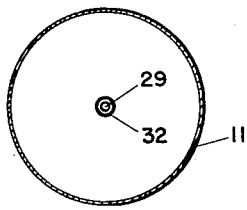
Fig. 2 is a section on the line II—II of Fig. 1, illustrating the interior of the tank for a relatively small body of liquid.
Figure 3:
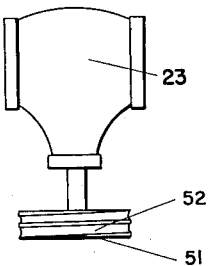
Fig. 3 is a detail view illustrating to an enlarged scale the peripheral, helical groove in the valve wheel of the supply valve shown in Fig. 1.

In order that the weight of the relatively small body of liquid in the tank 11 may be utilized for automatically controlling the feed valve 23 to maintain the desired liquid level in the evaporator, means suitably responsive to variations in the weight of this relatively small body of liquid may be provided. Preferably this means is in the form of a balance system comprising a horizontally disposed member in the form of a beam 26 mounted to pivot at its mid point, preferably, about a knife edge 27 carried by any suitable supporting structure, as indicated at 28. A supporting element in the form of a rod 29 may be pivotally mounted on one arm of beam 26, preferably, by means of a knife edge 31 carried by the beam, and arranged to extend downwardly through a guide passage extending along the vertical axis of the tank 11 and formed by a tube 32 (Fig. 2) making fluid tight connections with the top and bottom of this tank. Below the tank this rod may be equipped with abutments in the form of collars 33, 34 and 36 adjustable longitudinally thereof to suitable fixed positions as by means of set screws 37. The collar 33 is adapted to be adjusted to a position for supporting this tank at a proper vertical height. The collars 34 and 36 may be spaced on opposite sides of a fixed abutment 38 in the form of an angle bracket arranged to be engageable with these collars for limiting vertical movement of rod 29 and of tank 11 carried thereby.

For counter balancing the weight of tank 11, its contents and associated parts, there may be provided a counter weight 39 carried by a vertically disposed rod 41 extending slidably through aligned guide openings (not shown) in upper and lower guides in the form of fixed angle brackets 42 and 43 conveniently mounted on the evaporator shell and spaced for engagement with the weight to limit the extent of its upward and downward movement. Preferably, a flexible element, such as a cable 44, is provided for suspending this counter weight from the other arm of beam 26. The lower end of this cable may be formed into a suitable loop extending through a ring or clevis 46 pivotally secured to the upper end of rod 41, while the upper end of this cable may be formed into a similar loop extending through an eye 47 depending from a narrow sleeve 48 disposed about and supported preferably by a knife edge 49 carried by beam 26. The intermediate portion of cable 44 may be trained about the periphery of valve wheel 51 of valve 23 for operating the latter. Preferably, this valve wheel is provided with a peripheral, helical groove 52 in which the cable is received.

In using this apparatus the balance system is arranged to be in equilibrium when the desired level prevails in the evaporator. It will be evident that the vertical position of the tank 11 with respect to its supporting rod 29 determines the level at which liquid will stand in this tank and also the quantity and weight of liquid therein when the balance system is in equilibrium. Some preliminary adjustment of the vertical position of tank 11 may be necessary to bring the system into balance when the desired level prevails in the evaporator. As tank 11 need contain only a few pounds of liquid, for example, five pounds may be entirely adequate, it will be seen that an adjustment of this kind may be readily made without difficulty for this involves merely loosening the set screw 37 in collar 33 and setting the latter to the proper position on rod 29 and then tightening the set screw. When the tank 11 is closed to atmosphere, as shown, the equipment is preferably arranged so that the surface level of liquid in this tank stands approximately at its horizontal center line when the desired level prevails in the evaporator. Abutments 34 and 36 may be adjusted for engagement with fixed abutment 38 to prevent excessive travel of the tank and similarly, abutments 42 and 43, which may also be adjustable if desired, are so arranged as to engage the counter weight 39 to prevent excessive movement thereof upwardly and downwardly, so as to discontinue the application of force tending to operate the feed valve substantially when the latter reaches its fully open or fully closed position. It will also be understood that valves 17 and 22 are open when the apparatus is in use.

This apparatus functions automatically to maintain the desired liquid level in the evaporator. If the liquid level in the evaporator falls below the dotted line 12, the surface level of the liquid in tank 11 drops to the same extent. This decreases the weight of liquid in the tank so that the latter is no longer able to balance weight 39 which therefore, starts to descend and in so doing acts through the leverage shown to move the tank upwardly. As the weight descends and pulls the cable 44 downwardly, the loop of cable about the wheel 51 of feed valve 23 turns this wheel in a direction to open this valve. As tank 11 moves upwardly the weight of liquid therein progressively decreases, thereby accelerating the opening movement of the feed valve so as to increase the rate of flow of liquid into the evaporator and quickly restore the desired level therein. The feed valve then remains open until the liquid level in the evaporator rises sufficiently above the dotted line 12 to cause a sufficient amount of liquid to flow into tank 11 to overbalance the weight which then moves upwardly. During this movement the loop of cable about valve wheel 51 turns the latter in a direction to close the feed valve, which may be partly or fully closed depending upon the demands being made upon the evaporator. With the apparatus in equilibrium, as shown in the drawing, the feed valve preferably is substantially midway between its fully open and fully closed position. This provides for good regulation of the liquid level in the evaporator. It will be understood that the feed valve is fully closed only when the liquid level in the evaporator is sufficiently above the dotted line 12 to cause the tank 11 to overbalance the weight and that as the tank moves downwardly the quantity of liquid therein progressively increases thereby accelerating its descent so as quickly to correct any variation in the level in the evaporator. Ordinarily, if the parts are properly proportioned to meet the demands to be made upon the system, as will be understood by those skilled in this art, the feed valve will operate around its mid position and maintain the level in the evaporator within very close limits.

While the invention has been illustrated as including a balance system in which the relatively small body of liquid in tank 11 and weight 39 are adapted to move vertically for controlling the feed valve, other arrangements may be provided embodying the same principle as will be understood by those skilled in this art when informed by this specification. It will be seen that weight 39 constitutes a means for applying a substantially constant force tending to move the relatively small body of liquid in tank 11 in one direction, while the liquid within this tank provides an opposing force varying approximately as the weight of this liquid for tending to move the latter in a substantially opposite direction. These opposing forces may be provided by means other than those illustrated; and these forces may act in directions other than vertical for accomplishing the desired result. It will also be understood that it is within the scope of this invention to supply the make-up liquid to tank 11 instead of directly to the evaporator, although the latter arrangement is preferred.

From the foregoing it will be seen that I have provided a liquid level regulator adapted to be disposed entirely outside of the vessel in which the liquid level is to be controlled so that the operation of the regulator may be observed, its parts may be readily inspected and replaced, and the life of its working or moving parts is prolonged and their operation is improved by the elimination of the corrosive action of liquids, concentrates and the like. Only about 20% of the regulator of the illustrated embodiment is exposed to the action of liquids which may be corrosive, and this 20% of the regulator, comprising tank 11 and the connections thereto, may be under constant observation. Due to the more or less continual flow of liquid, there is little opportunity for objectionable accumulations of brine and salt paste, for example, in those parts of the regulator which contact the liquid. It will also be evident that the improved regulator in accordance with this invention may be of simple, durable and inexpensive construction.

The invention described herein, if patented, may be manufactured and used by or for the Government for governmental purposes without the payment to me of any royalty thereon.

It should be understood that the present disclosure is for the purposes of illustration only, and that the invention includes all modifications and equivalents which fall within the scope of the appended claims.

I claim as my invention and desire to secure by my patent:

1. The combination of relatively fixed and movable chambers adapted to contain liquid under absolute pressure, connections for maintaining the liquid in said chambers at substantially the same level, the relatively movable chamber having a passage extending therethrough in substantially fluid tight relation therewith and along the substantially vertical axis thereof, a rod extending through said passage, abutments carried by said rod, one of said abutments being engageable with the relatively movable chamber for supporting the latter from the rod, fixed abutment means engageable with other of said abutments carried by said rod for limiting the movement thereof, a pivotally mounted member connected to said rod, a weight connected to said pivotally mounted member for tending to balance said relatively movable chamber, a valve for controlling the flow of liquid from a source of supply thereof to one of said chambers, and means responsive to movement of said weight for operating said valve to restore the desired liquid level in said relatively fixed chamber.

2. The combination of relatively fixed and movable chambers adapted to contain liquid under absolute pressure, connections for maintaining the liquid in both chambers at substantially the same level, a member mounted to pivot intermediate the ends thereof, the relatively movable chamber having a passage extending therethrough in substantially fluidtight relation therewith and along the substantially vertical axis thereof, a rod pivotally connected to one arm of said pivotally mounted member and extending through said passage, abutments carried by said rod, one of said abutments being engageable with the relatively movable chamber for supporting the latter from the rod, fixed abutment means engageable with other of said abutments carried by said rod for limiting the movement thereof, a weight, a flexible element for connecting the weight to the other arm of said pivotally mounted member to oppose the weight of the relatively movable chamber, a valve for controlling the flow of liquid from a source of supply thereof to one of said chambers, a rotary element for operating said valve, said flexible element being trained around said rotary element for operating the latter on movement of the weight and the relatively movable chamber to restore the desired liquid level in the relatively fixed chamber.

GEORGE W. DICK.